United States Patent
Zervens et al.

(10) Patent No.: US 6,249,823 B1
(45) Date of Patent: Jun. 19, 2001

(54) SYSTEM FOR BUS MASTER CHANGEOVER WITH A DUMMY CYCLE ON A DATA BUS

(75) Inventors: Matiss Jonas Zervens, Järfälla; Orvar Per Dahl, Stockholm, both of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/182,866

(22) Filed: Oct. 30, 1998

(51) Int. Cl.[7] ............................. G06F 3/00; G06F 13/00; G06F 13/36; G06F 13/362

(52) U.S. Cl. ........................ 710/5; 710/5; 710/107; 710/118

(58) Field of Search ................... 710/5, 11, 60, 710/110, 120, 118, 131, 18, 107

(56) References Cited

U.S. PATENT DOCUMENTS

| | | |
|---|---|---|
| 4,455,620 | 6/1984 | Watanabe et al. . |
| 4,575,792 | 3/1986 | Keeley . |
| 5,018,098 * | 5/1991 | Taniai et al. .................. 710/22 |
| 5,127,089 * | 6/1992 | Gay et al. ...................... 710/108 |
| 5,175,821 | 12/1992 | Dutcher et al. . |
| 5,524,215 * | 6/1996 | Gay ................................ 710/107 |
| 5,625,847 * | 4/1997 | Ando et al. ..................... 710/60 |
| 5,633,605 * | 5/1997 | Zimmerman et al. ........... 326/86 |
| 5,754,825 * | 5/1998 | Hausauer et al. ............... 710/126 |
| 5,802,356 * | 9/1998 | Gaskins et al. ................. 713/500 |
| 5,964,856 * | 10/1999 | Wu et al. ........................ 710/110 |

* cited by examiner

Primary Examiner—Thomas Lee
Assistant Examiner—Chun Cao
(74) Attorney, Agent, or Firm—Burns, Doane, Swecker & Mathis, L.L.P.

(57) ABSTRACT

A method of accessing data from a plurality of DSUs allows for data to be accessed over a bi-directional data bus at full bus speed. If the execution of a bus cycle requires switching bus drivers that drive the data bus, a dummy cycle is executed before valid data may be presented on the bus. The execution of dummy cycle ahead of presenting data on the data bus allows for the elapse of a bus settlement time associated with physical properties of the data bus, thereby making it possible to operate the data bus at full speed.

17 Claims, 4 Drawing Sheets

SYSTEM FOR BUS MASTER CHANGEOVER WITH A DUMMY CYCLE ON A DATA BUS

TECHNICAL FIELD

This invention relates to the field of computer systems and more particularly to a method of accessing data at high speed.

BACKGROUND

Under a typical computer system architecture, a memory controller controls access to the system memory during read and write cycles. For accessing the system memory, the memory controller processes read and write requests generated by a central processor unit (CPU), requesting data to be read from or written into a particular memory address. Upon receipt of the CPU requests, the memory controller initiates corresponding read or write cycles over a data bus, for accessing the addressed memory locations. The rate by which data is transferred, i.e., the data throughput, during each memory cycle is dependent on the bus speed as well as the width of the system's data bus and the length of a memory position, which is defined in terms of data bits, for example, 8-bit, 16-bit, or 32-bit, etc.

Each memory cycle, read or write, expends a predefined number of clock cycles, which is primarily dependent on the speed by which data can be accessed from the memory. Because the performance of a computer system is highly dependent on the data throughput, it is necessary to maximize the data transfer rate over the data bus, ideally, making it reach the full system clock speed. In addition, various techniques have been devised to increase the data throughput by minimizing the time required to access the system memory. For example, under a scheme known as data interleaving, the system memory is divided into a number of DSUs, with each DSU being addressable on a corresponding separate physical address. When accessing data, either reading or writing data, the memory bus is switched from one DSU to another after the memory controller maps the logical memory address to the physical address. In this way, data may be written to a physical address on one DSU without completing a previous write request to a physical address on another DSU.

When reading or writing data, the data bus is driven by corresponding read and write drivers. For example, the memory controller may drive the data bus during the write cycles, and a Data Storage Unit (DSU) may drive the bus during the read cycles. Physical property of the data bus, however, requires the elapse of certain amount of bus settlement time, before valid data may be presented on the data bus. In a system that utilizes a high speed data bus, the initial requirement for the elapse of the bus settlement time may prevent operating the data bus at full speed, when the bus drivers are switched. It is, however, desired to provide memory access at full speed even when switching from one driver to another.

SUMMARY OF THE INVENTION

Briefly, according the present invention, a bi-directional data bus is operated at full speed by executing a dummy cycle, when the switching of the bus drivers becomes necessary. More specifically, a method of accessing data over the bi-directional data bus drives the bi-directional bus by at least two data bus drivers. The data bus is addressed in an interleaved manner. When one or more data access requests are received, a determination is made as to whether a bus cycle, read or write, executed based on a data access request requires switching from the current bus driver to another bus driver, for example, from a data storage controller (DSC) to a DSU. If so, at least one dummy cycle is generated over the bi-directional data bus, before placing the data associated with the bus cycle on the bi-directional bus. The execution of the dummy cycle ahead of presenting valid data on the bi-directional bus allows for elapse of the initial bus settlement time associated with physical properties of the bi-directional data bus, thereby allowing the bus to operate at full speed.

According to some of the more detailed features of the present invention, a determination is made as to whether the bus drivers of one data bus were used for executing a previous bus cycle. If not, a determination is made that the change of bus drivers is necessary and the dummy cycle is executed before presenting data over the bi-directional bus. Preferably, the dummy cycle is generated at least one clock cycle prior to valid data may be presented on the bi-directional data bus. According to yet another feature of the invention, the received access requests are queued. Based on the queued accesses requests, the execution timing of the bus cycles over the bi-directional data bus is adjusted to allow for the execution of the dummy cycle, if the switching of the bus drivers becomes necessary.

In an exemplary embodiment, the data over the bi-directional data bus is exchanged between the DSC and a plurality of DSUs. Based on a received read request for data from an addressed DSU, a determination is made as to whether the addressed DSU was driving the bi-directional data bus during a previous bus cycle. The addressed DSU generates the dummy cycle over the bi-directional data bus, if it was not driving the bi-directional bus during the previous bus cycle. Also, based on a received write request for data to be written into one or more DSUs, a determination is made as to whether the DSC was driving the bi-directional data bus during a previous bus cycle. The DSC generates the dummy cycle over the bi-directional data bus, if the DSC was not driving the bi-directional bus during the previous bus cycle.

DETAILED DESCRIPTION OF THE PREFERRED EMBODIMENT

Figure 1:
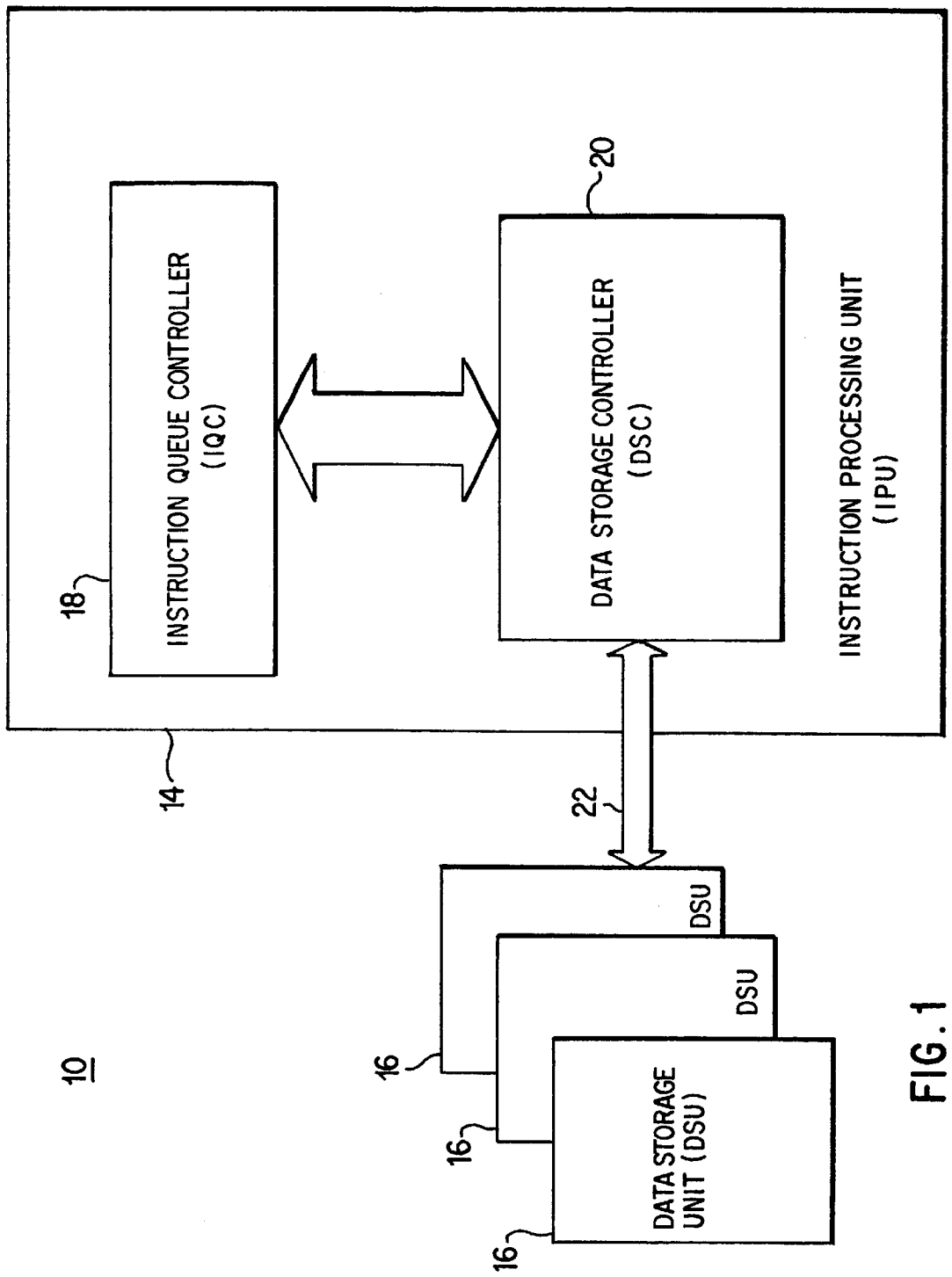
FIG. 1 is a block diagram of a computer system that advantageously incorporates thee invention.

Referring to FIG. 1, a block diagram of a computer system 10 that advantageously incorporates the present invention is shown. In the exemplary embodiment, the computer system 10 is a telephony computer system providing switching control for a public system telephone network (PSTN). Preferably, the computer system 10 is designed as a read priority system, where the read requests have priority over the write requests. The system 10 operates under the control of an Instruction Processor Unit (IPU) 14 that exchanges data stored in a plurality of interleaved Data Storage Units (DSU) 16 by executing a program that generates memory access requests, including read requests and write requests. A read request requests data variables or sub-variables from a specified memory location, and a write request modifies data variables or sub-variables.

In the exemplary embodiment of the invention, each memory location stores 32 bits (i.e. 4 bytes) of data that are addressable by a 32-bit address. Preferably, the interleaved arrangement of the DSUs 16 allows for data access to one DSU to start, while an access to another DSU is continuing. An Instruction Que Controller (IQC) 18 within the IPU 14 is responsible for sequencing access requests and providing them to a Data Storage Controller (DSC) 20. Based on a received access request, the DSC 20 generates corresponding read and write cycles over a data bus 22 according to the present invention.

Figure 2:
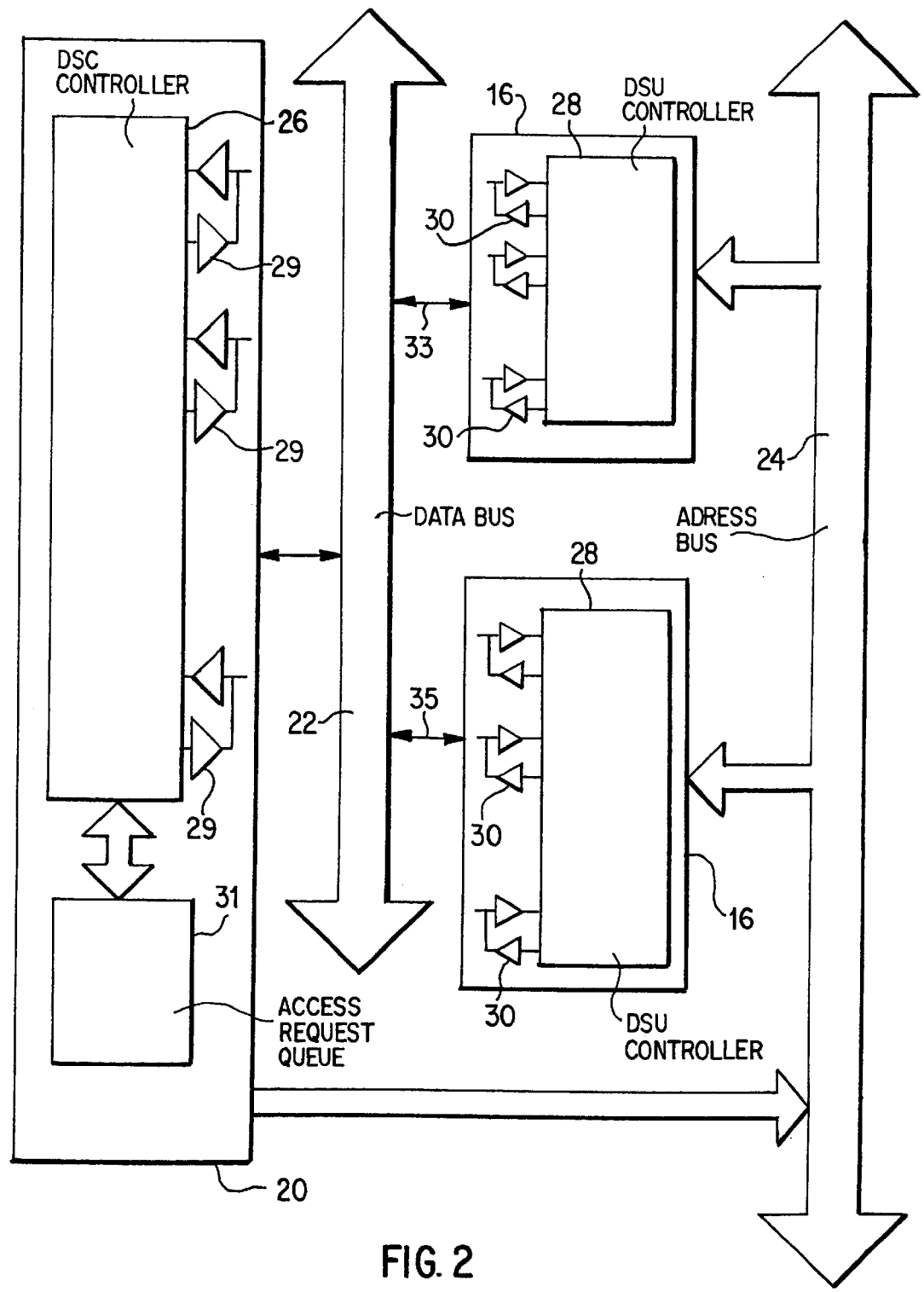
FIG. 2 is a block diagram illustrating the interconnection between a DSC and a plurality of DSUs that are incorporated in the computer system of FIG. 1.

Referring to FIG. 2, a more detailed block diagram depicts the DSC 20 and DSU 16 exchanging data over the data bus 22. In the exemplary embodiment of the invention, the plurality of DSUs 16 may incorporate a mix of Static Random Access Memory (SRAMs) and Dynamic Random Access memory (DRAMs), with the DSC 20 being provided with corresponding memory information for each one of the DSUs 16. Each read or write cycle is executed on the data bus 22 by expending a predefined number of clock cycles. The number of clock cycles for executing the read or write cycles corresponds primarily to the memory speed of a corresponding DSU 16. For example, a fewer number of clock cycles are necessary to execute a read or write cycle in a DSU that incorporated faster SRAM than one that incorporates slower DRAM.

The DSC 20 exchanges data with the DSUs 16 based on address information provided on an address bus 24. The address bus 24 is a unidirectional bus driven by the DSC 20, for addressing the DSUs 16. The data bus 22 is a bi-directional bus that based on the type of a memory cycle, i.e., read or write, may be driven by the DSC 20 or one of the DSUs 16, with the DSC 20 being the default bus master. During write and no-operation (NOP) cycles, the data bus 22 is driven by the DSC 20 through DSC drivers 29, which physically present the data to be written to an addressed DSU 16 on the data bus 22. However, during read cycles, when a DSU 16 provides data to the DSC 20, the data bus 22 is driven via DSC drivers 30 of an addressed DSU 16. FIG. 2 shows two DSUs 16 each having a corresponding data bus 33 and 35 that are physically connected to the data bus 22 and interacting in an interleaved mode. Corresponding DSC and DSU controllers 26 and 28 control the timing and signaling requirement for driving the data bus 22 through the DSC and DSU drivers 29 and 30, as well as exchanging the memory information, when necessary. As a result during write cycles, the bi-directional data bus 22 is driven by the DSC drivers. 29 and during read cycles, it is driven by corresponding DSU drivers 30 of each one of the DSUs 16. An access request queue 31 queues the read or write requests received at the DSC 20. As explained later in detail, the DSC controller 26 adjusts execution timing of bus cycles based on the queued access requests to allow the data bus 22 to operate at full speed.

According to the present invention, data over the data bus 22 is accessed by determining whether executing a bus cycle requires switching drivers that drive the bi-directional data bus 22. If so, a dummy cycle is generated, before placing valid data on the bi-directional bus 22. In this way, the generation of the dummy cycle allows for the elapse of the initial settlement time associated with the bus's physical properties, before valid data may be presented on the data bus 22.

Figure 3:
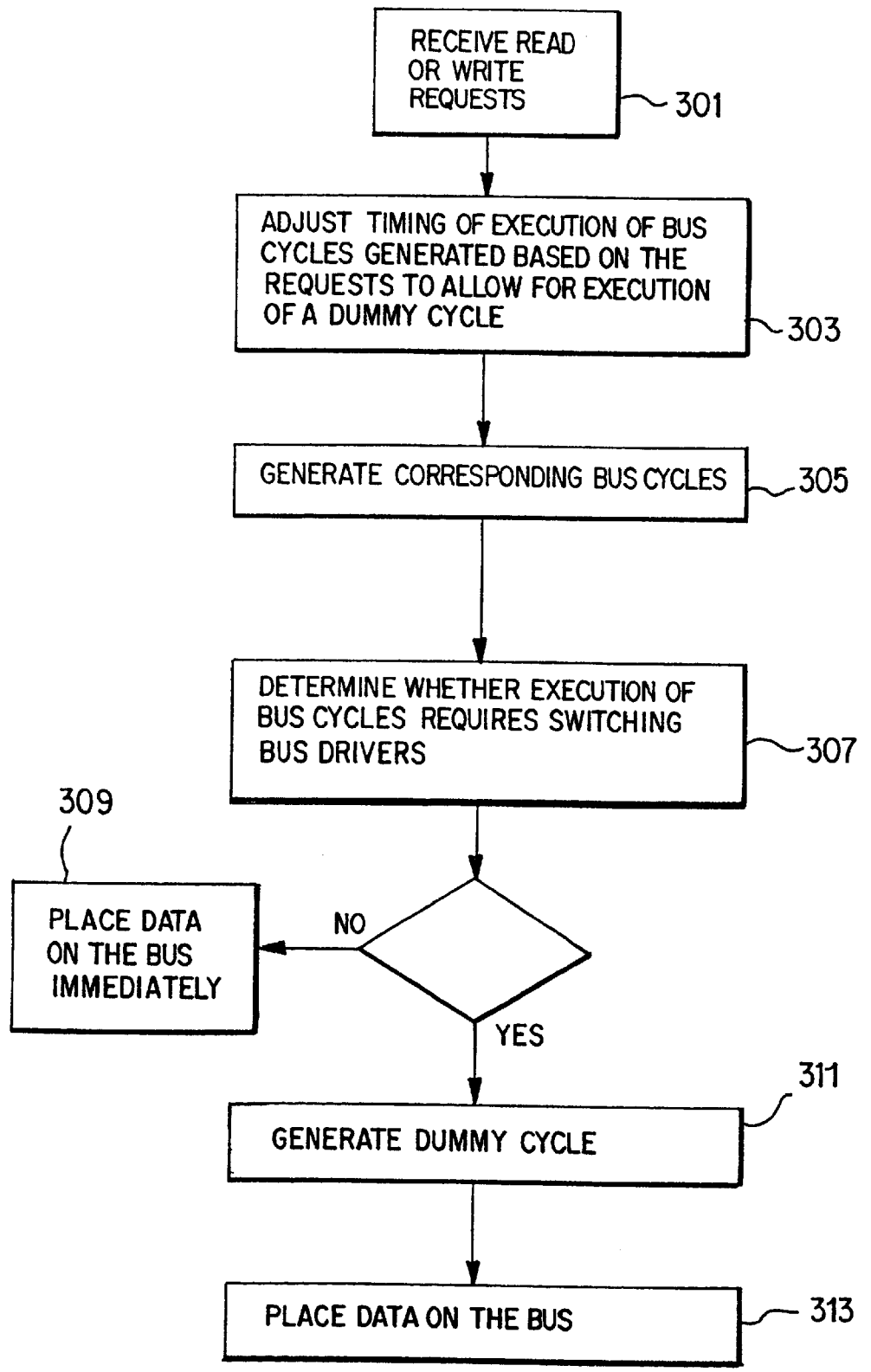
FIG. 3 is a flow chart of a method for accessing data according to the present invention.

Referring to FIG. 3, a flow chart for the method of accessing data according to the invention is shown. In block 301, the DSC 20 receives and queues read or write requests for reading or writing data in connection with the DSUs 16. Based on memory information corresponding to an addressed DSU 16, the DSC 20 adjusts the timing of the execution of bus cycles, read and write, to allow for the execution of a dummy cycle before valid data may be presented on the bus, if the execution of the bus cycle requires switching between from the DSC drivers 29 or to the DSU drivers 30 or between the DSU Drivers 29 of one DSU and DSU drivers of another DSU, block 303. Then, DSC 20 generates the scheduled bus cycles, block 305. In block 307, a determination is made as to whether the execution of a bus cycle generated based on the received read or write request requires changing the drivers that drive the data bus 22. If not, the data is placed on the data bus immediately, block 309. If, however, the execution of the bus cycle requires switching of the bus drivers, the dummy cycle is generated, before placing the data on the data bus 22, blocks 311 and 313.

More specifically, in response to a write request, a determination is made as to whether the execution of an associated write cycle requires the switching of the drivers that drive the bi-directional bus 22. If the write cycle is subsequent to a previous write cycle, which uses the same drivers to drive the data bus 22, the DSC 20 does not insert the dummy cycle, because the elapse of bus settlement time is not necessary. If, however, the write cycle is followed by a bus cycle that requires switching the bus drivers, the DSC 20 generates a dummy cycle prior to placing the data to be written into the addressed DSU 16, in order to allow for the elapse of the bus settlement time. For example, when the write cycle is followed by a previous read cycle, a change in bus drivers becomes necessary. This is because instead of the DSU drivers 30 that drove the bus during the previous cycle, the DSC drivers 29 must drive the bi-directional bus 22 when executing the new write cycle. As a result, the DSC 20 inserts the dummy cycle to allow for the elapse of the bus settlement time.

As described above, during write cycles, the dummy cycle is generated by the DSC 20 acting as the default bus master. Under other circumstances, however, a DSU 16 may generate the dummy cycle. This situation arises when the execution of a read cycle for data from an addressed DSU 16 requires the switching of the bus drivers. For example, when a new read cycle to an addressed DSU 16 is followed by a read cycle that read data from another DSU 16. In this situation, the addressed DSU 16 determines whether it was driving the bus during the previous cycle. If not, a change in bus drivers is required and the addressed DSU 16 generates a dummy cycle prior to placing the requested data on the data bus 22. Otherwise, if the addressed DSU 16 was driving the bus during the previous cycle no change in bus drivers is required and the addressed DSU 16 does not generate the dummy cycle.

Figure 4A:
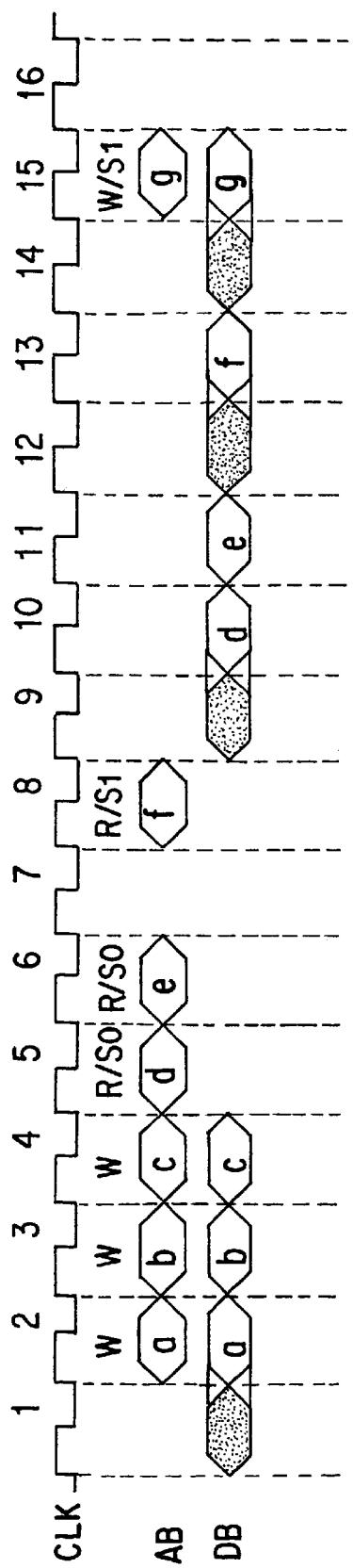
FIGS. 4 (a) and 4(b) are bus timing diagrams for two exemplary data accesses under the method of the present invention.
Figure 4B:
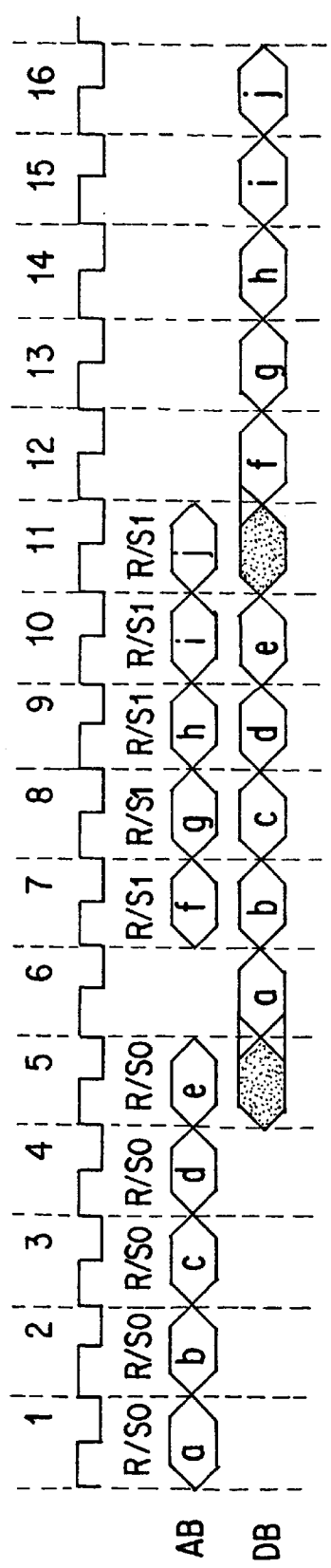

FIGS. 4 (*a*) and (*b*) are bus cycle timing diagrams depicting two exemplary situations that illustrate the method of accessing data according to the present invention. As illustrated in FIG. 4(*a*), during clock cycles 2 through 6, the address bus (AB) is presented with write cycles (a), (b), and (c), preceded by two read cycles (d) and (e) for data from a DSU (s0). Subsequently, during clock cycle 8, the address bus (AB) is presented with a read cycle (f) from a DSU (s1) followed by a write cycle (g), which occurs during clock cycle 14, for writing data into DSU (s1). Because during write cycles (a), (b) and (c), no change in bus drivers is necessary, the DSC 20 places write data on the bi-directional data bus (DB), immediately during the clock cycles 2–4.

However, starting at clock cycle 5, the execution of the read cycle (e) for data from the DSU (s0) requires changing the bus drivers from the DSC drivers 29 to DSU drivers 30. As explained above, while the DSC 20 is the default bus master during write cycles and NOP cycles, the DSUs 16 take control of the data bus 22 during read cycles. Assuming that based on the memory speed associated with the DSUs (s0) and (s1), each read cycle is executed within 5 clock cycles, the DSU (s0) generates a dummy cycle during clock cycle 9, four cycles after clock cycle 5 and one cycle ahead of clock cycle 10, when valid data is presented on the bus. As described above, the execution of the dummy cycle one clock cycle before valid data may be presented on the data bus allows for operating the data bus at full speed. During clock cycle 11, the DSU (s0) places data corresponding to the read cycle (e) without generating a dummy cycle, since the DSU (s0) was controlling the bus during the preceding clock cycle 10. The execution of the read cycle (f) for data from DSU (s1) requires a change of bus drivers from bus drivers of DSU (s0) to bus drivers of DSU (s1). Therefore, prior to presenting data on the data (DB), the DSU (s1) generates a dummy cycle during the clock cycle 12 by determining that it was not controlling the bus during the preceding cycle.

The DSC 20, which controls the generation of read and write cycles over the data bus 22, includes logic that based on memory speed of a particular DSU 16 and the sequence of queued access requests adjusts the execution timing of the bus cycles to allow for execution of the dummy cycle at least one cycle ahead of when valid data may be presented on the data bus 22. Therefore, depending on whether an addressed DSU 16 is a SRAM or a DRAM DSU, the DSC 20 may adjust the execution timing of the execution of the read cycles so that the dummy cycle is generated in a timely manner. For example, in the above illustration, the execution of the read cycle (e) and (f) is timed so that DSU (s1) may generate the dummy cycle during clock cycle 12, one cycle ahead of when it presents valid data on the data bus (DB), i.e., during clock cycle 13. Finally, DSC 20 generates a dummy cycle during clock cycle 14, one cycle prior to when the write data for the write cycle (g) is placed on the data bus (DB). By adjusting the execution timing of the bus cycles for placing a dummy cycle ahead of when valid data is to be presented, the present invention allows the data bus (DB) to be operated at full speed.

FIG. 4(*b*) illustrates another exemplary situation for running the data bus (DB) at full speed. Under this example, based on received memory access requests at the DSC 20, read cycles (a)–(e) for data from the DSU (s0) are generated during clock cycles 1–5 followed by read cycles (f)–(j) for data from the DSU (s1) during clock cycles 7–11. As explained above, the DSC 20 adjusts the execution timing of the bus cycles to allow for generation of the dummy cycle, when the data bus 22 is switched from being driven by the drivers of the DSU (s0) to being driven by the drivers of the DSU (s1). In the above example, the DSC 20 adjusts the execution time of the read cycles by inserting a delay at clock cycle 6 to allow the DSU (s1) generate a dummy cycle during clock cycle.

From the foregoing description it would be appreciated that the present invention increases data throughput over the data bus 22 by adjusting the timing of the bus cycles to allow for execution of a dummy cycle any time bus drivers for reading or writing data are switched.

What is claimed is:

1. A method of accessing data over a bi-directional data bus including the steps of:
   (a) driving the bi-directional bus by at least two physically separate data bus drivers;
   (b) receiving one or more data access requests;
   (c) determining whether a bus cycle executed based on a data access request requires switching from one of the two physically separate bus drivers to another one of the two physically separate to the bus drivers;
   (d) generating at least one dummy cycle over the bi-directional data bus, if the switching of the bus drivers is necessary; and
   (e) placing the data associated with the bus cycle on the bi-directional bus after generating the at least one dummy cycle.

2. The method of claim 1, wherein step (b) includes the steps of
   (c)(1) determining whether the same bus drivers were used for executing a previous bus cycle; and
   (c)(2) determining that the change of bus drivers is necessary if the same bus drivers were not used for executing the previous cycle.

3. The method of claim 1 further including the steps of:
   queuing the one or more access requests; and
   based on the queued access requests, adjusting execution timing of the bus cycles to allow for the execution of the dummy cycle.

4. The method of claim 1, wherein step (c) includes the step of generating the at least one dummy cycle at least one clock cycle prior to valid data may be presented on the bi-directional data bus.

5. The method of claim 1, wherein step (b) requires receiving a read request for data to be read from an addressed DSU; wherein step (c) includes the step of determining whether the addressed DSU was driving the bi-directional data bus during a previous bus cycle; and wherein step (d) includes the step of generating the at least one dummy cycle over the bi-directional data bus if the addressed DSU was not driving the bi-directional bus during the previous bus cycle.

6. The method of claim 1, wherein step (b) requires receiving a write request for data to be written into one or more DSUs; wherein step (c) includes the step of determining whether a Data Storage Controller (DSC) was driving the bi-directional data bus during a previous bus cycle; and wherein step (d) includes the step of generating the at least one dummy cycle over the bi-directional data bus if the DSC was not driving the bi-directional bus during the previous bus cycle.

7. The method of claim 5, wherein data over the DSUs are accessed in an interleaved manner.

8. The method of claim 1, wherein the duration of the at least one dummy cycle is such that it allows for elapse of an initial bus settlement time associated with physical properties of the bi-directional data bus.

9. A method of adjusting execution timing of a bi-directional data bus by a bus master comprising:
   receiving at least one data access request;
   determining said at least one data access request involves switching from one of two physically separate bus drivers to another one of the two physically separate bus drivers; and
   adjusting execution timing of a bus cycle associated with said at least one data access request to allow for the execution of at least one dummy cycle, if said at least one data access request involves switching of said bus drivers.

10. The method of claim 9, wherein the bus master is a data storage controller (DSC).

11. The method of claim 9 further comprising:

controlling generation of read and write cycles over the bi-directional data bus.

12. The method of claim 9 further comprising:

generating the at least one dummy cycle over the bi-directional data bus; and placing the data associated with the bus cycle on the bi-directional bus after generating the at least one dummy cycle.

13. The method of claim 9, wherein determining whether switching is required comprises:

determining whether the same bus drivers were used for executing a previous bus cycle; and determining that the change of bus drivers is necessary if the same bus drivers were not used for executing the previous cycle.

14. The method of claim 9 further comprising:

queuing the one or more access requests.

15. The method of claim 14 further comprising:

adjusting the execution timing of the bus cycles based on a sequence of queued access requests to allow for execution of the at least one dummy cycle at least one cycle ahead of when valid data may be presented on bi-directional the data bus.

16. The method of claim 9, wherein the bus cycle execution timing is adjusted to allows for at least one clock cycle prior to placing valid data on the bi-directional data bus.

17. The method of claim 9, wherein the duration of the at least one dummy cycle is such that it allows for elapse of an initial bus settlement time associated with physical properties of the bi-directional data bus.

* * * * *